United States Patent
Lautenschlager

[19]

[11] Patent Number: 6,054,695
[45] Date of Patent: Apr. 25, 2000

[54] APPARATUS FOR CONDENSING GASES WITHIN A MICROWAVE RADIATION FIELD

[75] Inventor: Werner Lautenschlager, Leutkirch, Germany

[73] Assignee: Milestone S.r.l., Sorisole, Italy

[21] Appl. No.: 09/124,827

[22] Filed: Jul. 30, 1998

[51] Int. Cl.[7] .................................................. H05B 6/80
[52] U.S. Cl. .......................................... 219/687; 219/686
[58] Field of Search .................................. 219/686, 687, 219/688; 202/176, 177, 205, 235

[56] References Cited

U.S. PATENT DOCUMENTS

| | | | |
|---|---|---|---|
| 3,535,482 | 10/1970 | Kluck | 219/687 |
| 3,778,578 | 12/1973 | Long et al. | 219/687 |
| 4,488,935 | 12/1984 | Ruhe | 202/177 |
| 4,736,083 | 4/1988 | Saville | 219/686 |
| 4,826,575 | 5/1989 | Karamian | 202/176 |
| 5,338,409 | 8/1994 | Heierli | 202/205 |
| 5,366,595 | 11/1994 | Padgett et al. | 201/19 |
| 5,382,414 | 1/1995 | Lautenschlager | 422/186 |
| 5,711,857 | 1/1998 | Armstrong | 202/235 |

*Primary Examiner*—Tu Ba Hoang
*Attorney, Agent, or Firm*—Lacasse & Associates; Randy W. Lacasse; Wesley L. Strickland

[57] ABSTRACT

Disclosed is an apparatus for condensing vapors for use inside a microwave cavity. The cooling in the apparatus is provided by gas flow ventilation with air being the most convenient gas for use as a coolant. The apparatus has two ports, one port for connecting with a sample vessel and a second port for connecting with a pressure control device. The pressure control device has valves for operating a vacuum line and a feeding line. The disclosed apparatus enables a plurality of chemical digestion reactions, reflux reactions and dehydrations to be carried out simultaneously or sequentially within a microwave radiation field.

17 Claims, 2 Drawing Sheets

've6,054,695

APPARATUS FOR CONDENSING GASES WITHIN A MICROWAVE RADIATION FIELD

FIELD OF THE INVENTION

This invention relates generally to microwave heated reaction systems, and more particularly for performing physical and chemical processes with a microwave radiation field.

BACKGROUND OF THE INVENTION

This invention relates to an apparatus used for microwave heated reaction systems for performing physical or chemical processes within a microwave radiation field, for example for digesting materials to be analyzed by AAS/AES, ICP or other qualitative or quantitative techniques.

In some instances when heating is required to invoke a chemical reaction, there is concern over the loss of volatile components of the reaction mixture. This is often the case when mixtures are heated in open vessels. In the past, techniques for closed vessel heating of materials have been developed. Such techniques reduce or eliminate the loss of volatile components during the heating process.

Heating reaction mixtures in closed vessels can produce high pressures within the vessels resulting from the increased partial pressures of the individual components of the reaction mixture at elevated temperatures. Safety in the modern laboratory requires careful attention to the design and fabrication of reaction vessels to prevent catastrophic mechanical failure accompanied by violent ejection of reaction materials and potential injury to laboratory personnel (see chapter on safety in Skip Kingston's book).

Properly designed microwave reactor vessels incorporate a pressure release mechanism to safely and predictably vent excessive pressures within a vessel, in the event that the internal pressure of the reactor exceeds the recommended operating pressure of the vessel, and before the internal pressure exceeds the design limits of the vessel. In U.S. Pat. No. 5,382,414, herein incorporated by reference, a vessel is disclosed having a cover held in place by an elastic "spring" for releasing vapor when excess pressure builds within the vessel and then resealing the vessel.

There are alternatives to the use of closed vessels for heating reaction mixtures while limiting the loss of volatile components of the mixture. One approach is the use of vapor condensers connected to opened vessels. Such vapor condensing apparatuses cool the escaping vapors from the open vessels, below the boiling point of the escaping components, so that the vapors are condensed into their liquid state and will flow back into the sample vessel.

Among the patents that disclose the use of condensing units in combination with microwave radiation to supply heat to a system, external condenser units have been reported. For example, U.S. Pat. No. 4,826,575 discloses an apparatus for the production of high purity water by microwave heating technology. The condenser is a conventional unit available from any number of major laboratory glassware supply companies and is cooled traditionally by passing water through the condenser unit.

In U.S. Pat. No. 4,488,935, Ruhe discloses an apparatus for the continuous feed distillation of a fluid in a vacuum using solar/microwave energy. The apparatus includes a microwave energy source and a solar energy collector. However, the condenser coil is located outside the limits of the microwave cavity. Since many microwave ovens are designed with magnetrons or waveguides situated at a top portion of the ovens, such that the microwave field is projected downward into the cavity; only particular microwave ovens can accommodate the use of vapor condensers that penetrate the cavity or extend through the top of the microwave oven.

In U.S. Pat. No. 5,366,595, Padgett et al. disclose a mobile apparatus for pyrolyzing carbonaceous material and a method related thereto. Microwave radiation heats the waste material inside a cylinder to rapidly convert it into solid and fluid products. The fluid products escape outwardly from the sample containing cylinder and are transferred to a heat exchange chamber where they are cooled and any evolved vapors are condensed into liquid form and are further cooled. As disclosed, this apparatus also features a cooling system external to the microwave cavity.

More recent applications which describe an apparatus for distilling liquids by heating them inside a microwave heating chamber are disclosed by Heierli (U.S. Pat. No. 5,338, 409; EP 0592443; WO 9209351) and Armstrong (U.S. Pat. No. 5,711,857). The condenser unit for these apparatuses is located externally to the microwave cavity for receiving and cooling vapors emitted from the liquid when heated within the microwave radiation field.

As was discussed in U.S. Pat. No. 4,826,575, it is also critically important that laboratory personnel be protected from exposure to microwave radiation. In the October 1980 issue of National Safety News an article by Howard Basson of the Food and Drug Administration, entitled Radio-Frequency and Microwave Radiation, sets out the FDA requirements on page 60 as follows:

For about 10 years, the FDA microwave oven performance standard has been in effect. Because 100 percent testing programs are required of all oven manufacturers, very few cases have existed where individual ovens have generated leakage levels of more than the maximum permissible level. The five $mW/cm^2$ maximum permissible level, measured two inches (five centimeters) from an oven's surface, is a value that must not be exceeded over the working lifetime of any oven.

It is an object of this invention to provide an apparatus to perform heating if processes with reflux condensation, recovery, and retention of evolved vapors within a microwave radiation field. Traditional water-cooled condensing systems are not usable within a microwave cavity since the coolant will absorb the microwave radiation and heat up. In general it is difficult to use many traditional liquid condenser coolants as they possess a significant microwave absorption cross-section and hence will absorb energy and become hot. Also, the sample vessel to which the condenser is attached is desired to be rotated within the microwave cavity, to ensure homogeneity of exposure to the microwave field, thus adding further difficulty to a liquid cooling system particularly when more than one sample vessel is used at the same time.

SUMMARY OF THE INVENTION

In accordance with the invention there is provided a method for condensing vapors within a microwave radiation field, the method comprising the steps of:

generating the vapors by applying microwave radiation to a sample in a sample vessel within a microwave cavity, the sample vessel connected to a condenser located within the microwave cavity; applying gas flow ventilation within the microwave radiation field inside the cavity and outside of the condenser; and condensing the vapors in the condenser through sufficient cooling provided by applying gas flow ventilation within the microwave radiation field inside the cavity and outside of the condenser.

In accordance with the invention, there is further provided a gas-cooled condenser for condensing vapors in absence of liquid coolant comprising:

a condenser having a large surface area for providing sufficient cooling when a gas is passed over the external surface of the condenser; a first port in one location of the condenser for coupling with a sample vessel; and a second port in another location of the condenser for coupling with a pressure control device.

In accordance with the invention, there is further provided an apparatus for use within a microwave radiation field comprising:

a condenser for condensing vapors, wherein the condenser is shaped such that air flow through a microwave radiation field provides sufficient cooling for the condenser during application of microwave radiation; a first port in one location of the condenser for connecting with a vessel, the first port for receiving vapors from the vessel and; a second port in another location of the condenser for connecting with a pressure control device, the second port in fluid communication with the first port In accordance with the invention, there is further provided an apparatus for use within a microwave radiation field consisting of:

a condenser for condensing vapors, wherein the condenser is shaped such that air flow through a microwave radiation field provides sufficient cooling for the condenser during application of microwave radiation; a first port in one location of the condenser for connecting with a vessel, the first port for receiving vapors from the vessel and; a second port in another location of the condenser for connecting with a pressure control device, the second port in fluid communication with the first port.

Advantageously the FDA requirements can more easily be met with the instant invention as the entire apparatus including the condenser is located inside the microwave cavity. This arrangement not only allows for more safe operation of a microwave oven under reflux conditions but also allows more than one sample to be treated simultaneously and independently. An additional advantage with the condenser unit located inside the microwave cavity is a possibility of continuous fluid rinse, where the condensed vapors flowing into the vessel bring back any materials deposited on the inside walls of the condenser unit.

BRIEF DESCRIPTION OF THE DRAWINGS

Exemplary embodiments of the invention will now be described in accordance with the drawings in which.

Similar references are used in different figures to denote similar components.

DETAILED DESCRIPTION OF THE INVENTION

Figures 1, 2:
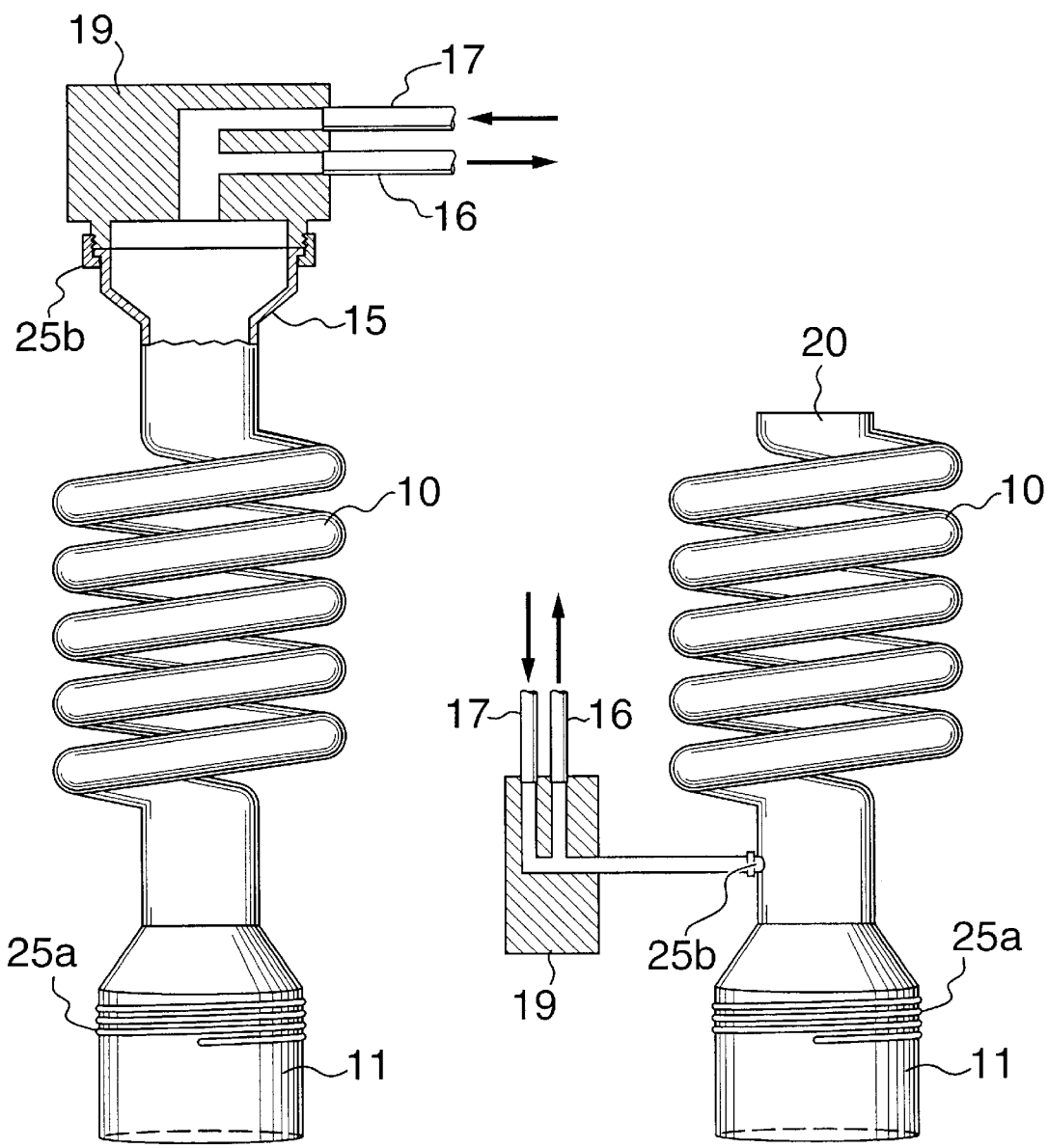
FIG. 1 is a sectional view of the apparatus for condensing vapors within a microwave radiation field according to the invention.
FIG. 2 shows a second form of the apparatus according to the invention in a sectional view.

Reference is now made to FIG. 1 presenting a sectional view of an apparatus for condensing vapors within a microwave radiation field. According to the invention the apparatus is composed of a condenser 10, which uses gas cooling, for condensing vapors generated by heating samples within a microwave cavity 30. The first port 11 connects the condenser 10 with a sample vessel 31; the second port 15 connects the condenser 10 with a pressure control device 19. Both, the first port 11 and the second port 15 are held in place by mechanical means and can have a lift/turn/lock mechanism that is optionally automated. The pressure control device 19 is designed so that it accommodates a vacuum line 16 and a feeding line 17. The horizontal lines in the drawing of the condenser 10 define air gaps in between the spirals of the column where gas flows to provide sufficient cooling.

FIG. 2 shows a modification of the apparatus presented in FIG. 1 in which a seal 20 is disposed at the top of the condenser 10. Therefore, the vacuum line 16 and the feeding line 17 are disposed between the first port 11 and the condenser 10 and are connected to the pressure control device 19.

Figure 3:
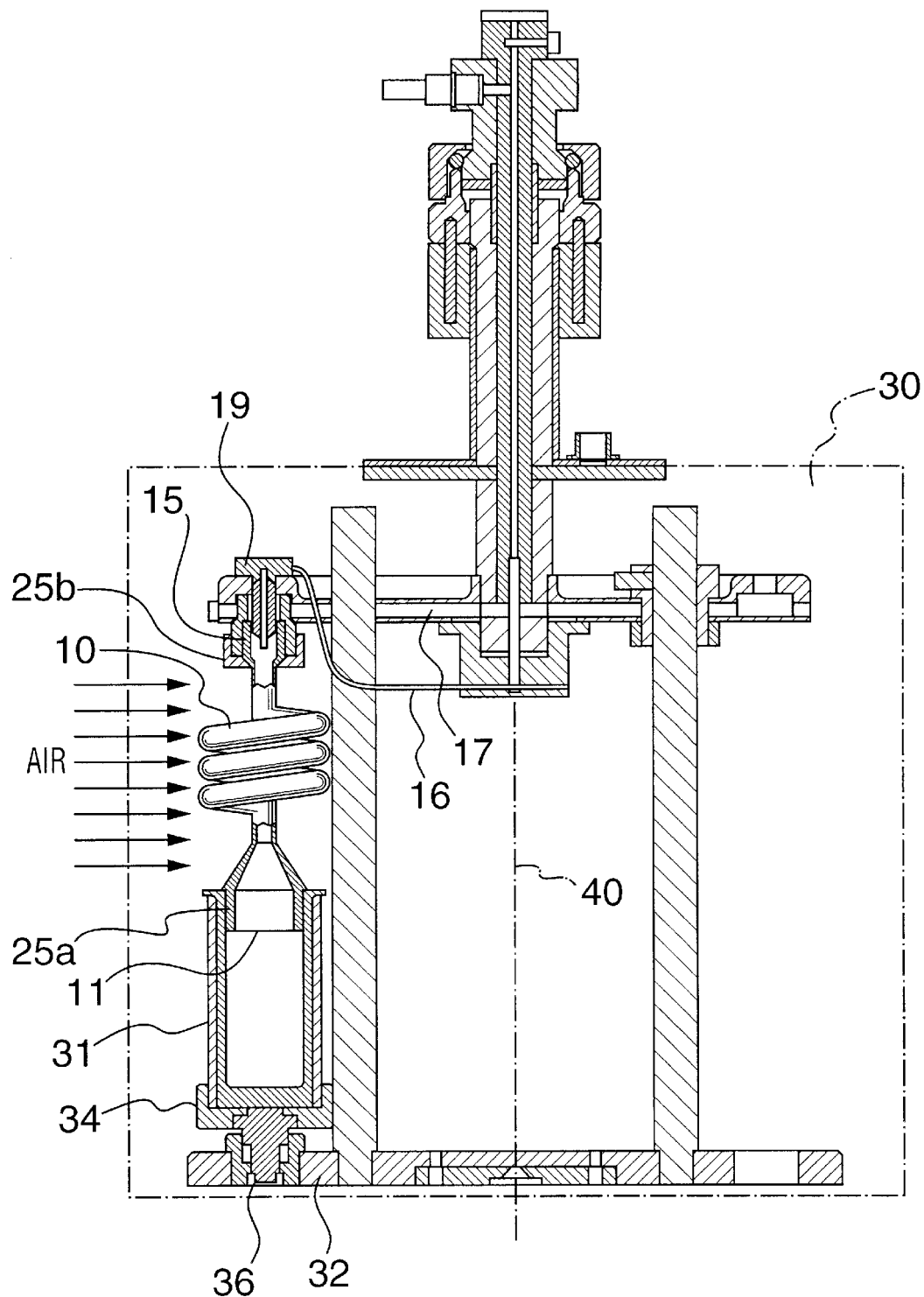
FIG. 3 is a sectional view of a microwave oven showing the apparatus for condensing vapors according to the invention in combination with a sample vessel and a pressure control device for use within a microwave radiation field.

FIG. 3 displays a diagram of a microwave cavity 30. A turntable 32 is placed inside this microwave cavity 30. The turntable 32 revolves around the axis of rotation 40. A base plate 34 is placed on the turntable 32 for receiving and holding a sample vessel 31 in place as shown in FIG. 3. The base plate 34 is shown to have a spring loading mechanism 36 to provide construction tolerance for expansion and contraction of the unit inside the microwave oven.

The apparatus according to the invention is connected to the sample vessel 31 through its first port 11 and to the pressure control device 19 through its second port 15.

The condenser 10 according to the invention is made from a material having a good chemical resistance, a low microwave absorption cross-section and good thermal conductivity. Materials which meet these requirements are polytetrafluoroethylene, quartz, and glass, for example borosilicate glass. The condenser can be made of either of these materials according to experimental requirements. The condenser 10 according to the invention is preferentially made from polytetrafluoroethylene or similar materials when experimental conditions require the heating of hydrofluoric acid within the sample vessel.

In the embodiment shown in FIG. 3, an apparatus according to the invention is used to perform heating processes with reflux condensation, recovery, and retention of evolved vapors in physical processes, chemical processes, and sample digestion processes inside a microwave cavity. The sample of interest is placed in a sample vessel 31 and the apparatus according to the invention is connected to the sample vessel. When microwave radiation is applied to the system, the sample inside the sample vessel 31 heats up and forms vapors. Vapors have a low microwave cross-section and thus are not heated to the same extent as the liquid inside the sample vessel. The formed vapors rise and move up to the condenser 10. Since the evolved vapors, such as steam, are not being heated to the same extent as the liquid sample within the microwave cavity, it is possible to cool and condense the vapors using gas flow ventilation as shown on the left-hand side in FIG. 3. Gas flow ventilation within the microwave radiation field is provided by supplying an air stream that forces air through the inside of the microwave cavity and out through the exhaust channel. Alternatively, an exhaust fan draws air through the microwave cavity. Air is generally the cheapest and most convenient gas used for providing gas cooling to the condenser. Of course a variety of other gases can be used to achieve a similar cooling effect, such as nitrogen or helium for example. Hence, the exhaust fan provides sufficient air-flow cooling for the reflux system by pulling air through the microwave cavity; problems associated with the use of conventional water cooled condensers for reflux systems, inside a microwave cavity, are thereby avoided.

The effect of airflow cooling is enhanced by configuring the condenser to have a large surface area such as the spiral configuration shown in FIGS. 1, 2 and 3. A condenser shaped in such a manner allows the air to flow in between the spirals and increases the cooling effect. FIG. 3 indicates that the condenser 10 preferably resembles a spiral tube having a low consistent angle for providing a balance between reflux condensation and vapor evacuation conditions.

A straight condenser, for example, would allow easy evacuation of vapors formed within the sample vessel whereas a condenser with a larger consistent angle—more horizontal spirals—than shown in FIG.3 would make it increasingly more difficult to evacuate the vapors evolved from the sample vessel, by means of an applied vacuum. Thus a spiral condenser with a low consistent angle renders a high cooling gas velocity through the spirals and produces a good reflux. However, if the vacuum line 16 in the pressure control device 19 is slightly opened the reflux will be substantially minimized even though the condenser 10 is still present. Hence it is not necessary to remove the condenser 10 from the vessel when evacuation of formed vapors is desired and advantageously the system is designed for operation in each of the two described modes. The vapors are condensed in one mode and the system is operated under reflux conditions. This is achieved, for example, by closing the vacuum line 16 in the pressure control device 19. In the second mode of operation, the vacuum line 16 remains open and the vapors, which form upon heating, are removed from the system. This mode of operation is important for the removal of volatiles or gases, which form during a reaction process. Examples of these gases include $CO_2$ and $NO_x$. This mode of operation is also useful for the removal of water vapors formed during dehydration processes. The possibility of two modes of operation—under either reflux or vacuum conditions—affords a convenient system where a common apparatus is used for purging or adding reagents to the sample vessels inside the microwave cavity without having to remove the sample vessels from the microwave oven. This facilitates fast and safe operation of physical or chemical processes. In addition, it is advantageous to have a feeding line 17 in fluid communication with the condenser 10 and the sample vessel 31 as it provides the possibility for a fluid rinse through the feeding line 17 to bring sample material from the walls of the condenser 10 back to the sample vessel 31.

In the embodiment of FIG. 3, it is possible to perform microwave heated reactions with sample volumes up to the entire volume of the sample vessel. Should further processing of the samples require operation under high pressure conditions it is imperative to provide a certain void volume in the sample vessel to accommodate the volume expansion factor when the sample is heated in a sealed vessel. The proposed system handles this requirement very efficiently by discontinuing the reflux conditions and opening the vacuum line 16 to the system. Instead of condensing on the condensor sidewalls, the formed vapors are now removed from the system resulting in a reduction of the sample volume. Hence it is not necessary to transfer a certain volume of the sample to another sample vessel for further processing in a pressurized system. This often reduces sample preparation time significantly. Alternatively, the sample is dehydrated completely according to the invention and then a reagent is added to the dried sample for easy sample preparation for high pressure chemical processing. Of course, the sample vessel requires a high pressure seal for the second operation; however, safety is greatly improved by eliminating a need to pour the sample from the sample vessel.

To ensure even heating of the sample it is advantageous to rotate the sample vessel inside the microwave cavity. The use of an individual apparatus for condensing vapors formed upon heating for each of a plurality of sample vessels inside the microwave cavity facilitates ease of rotational operation. Airflow ventilation can be readily applied simultaneously to a plurality of vessels and their respective condensers.

A sample starts to boil when its vapor pressure is equal to or very slightly greater than the atmospheric pressure of the environment. Since the apparatus according to the invention is connected to a pressure control device containing a vacuum line, it is further possible to control the boiling point of the sample via pressure control within the sample vessel. Thus, the boiling point of a sample can be lowered by reducing the pressure within the sample vessel, or alternatively the boiling point can be increased by increasing the pressure within the sample vessel.

Therefore, in yet another mode of operation, at pressures above atmospheric pressure, microwave heating of samples to temperatures above the temperature of the boiling point at atmospheric pressure of the mixture of components within the sample vessel is possible.

The use of sample vessels for microwave applications having a Weflon® reinforcement or the use of Weflon® stir bars inside the sample vessel 31 facilitates the heating of samples regardless of their microwave cross-section. Weflon® is a Milestone proprietary fluoropolymer and has a high microwave absorption cross-section. Thus, it absorbs microwave energy readily, which results in heating of either the sample vessel 31 or the stir bar placed therein. Samples with a low microwave absorption cross-section or a low dielectric constant will thus be heated through heat transfer from the Weflon® components surrounding the sample vessel 31 or from a Weflon® encapsulated stir bar directly to the sample.

Of course numerous other embodiments may be envisaged without departing from the spit and scope of the invention.

What is claimed is:

1. An apparatus for condensing vapors in absence of liquid coolant and being operable in at least two modes of operation—a first mode of operation for substantially condensing vapors and a second mode of operation for substantially evacuating vapors, the apparatus comprising:

(a) a condenser having a large surface area for providing sufficient cooling when a gas is passed over the external surface of the condenser;

(b) a first port in one location of the condenser for coupling with a sample vessel; and, (c) a second port in another location of the condenser for coupling with a pressure control device for accommodating a vacuum line.

2. An apparatus as defined in claim 1, wherein the apparatus is operable inside a microwave oven for transforming vapors from a gaseous state to one of a liquid state and solid state.

3. An apparatus as defined in claim 1, wherein the condenser has a substantially spiral configuration at a substantially low consistent angle for providing a high gas velocity through the spirals.

4. An apparatus as defined in claim 1, wherein the first port and the second port comprise a lift/turn/lock mechanism.

5. An aparatus as defined in claim 4, wherein the lift/turn/lock mechanism is automated.

6. An aparatus as defined in claim 1, wherein the condenser is operable for substantially increasing or decreasing the boiling point of a sample by increasing or decreasing the pressure within the sample vessel by means of the pressure control device; the pressure control device in fluid communication with the sample vessel through the second port.

7. An anparatus as defined in claim 1, wherein the other location is at an end of the condenser opposite the location of the first port and wherein the condenser is for condensing vapors in a first mode of operation under normal and increased pressures and the condenser is for conducting vapor in a second mode of operation under vacuum conditions.

8. An apparatus as defined in claim 1, wherein the condenser is shaped such that:
   in the first mode of operation—the vacuum line coupled to the second port via the pressure control device being closed—a substantial reflux of condensed vapors into the sample vessel is ensured and
   in the second mode of operation—the vacuum line being slightly opened for evacuating the vapors—the reflux is substantially minimized.

9. An apparatus as defined in claim 1, wherein the apparatus is operable in a third mode of operation for adding a substance through the condenser into the sample vessel, the substance being provided through a feed line in communication with the condenser.

10. An apparatus for use within a microwave cavity consisting of:
   (a) a condenser for condensing vapors sized to fit in a microwave cavity, wherein the condenser is shaped such that air flow through said microwave cavity provides sufficient cooling for the condenser during application of microwave radiation;
   (b) a first port in one location of the condenser for connecting with a vessel, the first port for receiving vapors from the vessel and;
   (c) a second port in another location of the condenser for connecting with a pressure control device, the second port in fluid communication with the first port.

11. An apparatus for condensing vapors in absence of liquid coolant, wherein the apparatus is for use within a microwave cavity, the apparatus comprising:
   (a) a condenser having a large surface area for providing sufficient cooling when a gas is passed over the external surface of the condenser, wherein the condenser is sized to fit in said microwave cavity;
   (b) a first port in one location of the condenser for coupling with a sample vessel; and
   (c) a second port in another location of the condenser for coupling with a pressure control device.

12. An apparatus for use within a microwave cavity comprising:
   (a) a condenser for condensing vapors sized to fit in a microwave cavity, wherein the condenser is shaped such that air flow through said microwave cavity provides sufficient cooling for the condenser during application of microwave radiation;
   (b) a first port in one location of the condenser for connecting with a vessel, the first port for receiving vapors from the vessel and;
   (c) a second port in another location of the condenser for connecting with a pressure control device, the second port in fluid communication with the first port.

13. An apparatus as defined in claim 12, wherein the condenser is made substantially of a material having a low microwave absorption cross-section.

14. An apparatus as defined in claim 12, wherein the condenser is made substantially of glass.

15. An apparatus as defined in claim 12, wherein the condenser is made substantially of polytetrafluoroethylene.

16. An apparatus as defined in claim 12, wherein the first port is detachably connected to the vessel by mechanical means.

17. An apparatus as defined in claim 12, wherein the second port is detachably connected to the pressure control device by mechanical means.

* * * * *

UNITED STATES PATENT AND TRADEMARK OFFICE
CERTIFICATE OF CORRECTION

PATENT NO.   : 6,054,695
DATED         : April 25, 2000
INVENTOR(S) : Lautenschlager It is certified that error appears in the above-identified patent and that said Letters Patent is hereby corrected as shown below:

Col. 2, line 42, "heating if processes" should read -- heating processes --

Col. 4, line 9, "mechanism that" should read -- mechanism 25a and 25b that --

Col. 6, line 44, "spit" should read -- spirit ---

Signed and Sealed this

Tenth Day of April, 2001

Attest:

NICHOLAS P. GODICI

Attesting Officer     Acting Director of the United States Patent and Trademark Office